United States Patent
Fritze

(10) Patent No.: US 6,857,670 B2
(45) Date of Patent: Feb. 22, 2005

(54) PLASTIC TUBE JOINT

(75) Inventor: Karl Fritze, Denmark Township, MN (US)

(73) Assignee: Cuno Incorporated, Meriden, CT (US)

( * ) Notice: Subject to any disclaimer, the term of this patent is extended or adjusted under 35 U.S.C. 154(b) by 229 days.

(21) Appl. No.: 10/124,847

(22) Filed: Apr. 18, 2002

(65) Prior Publication Data

US 2003/0102671 A1 Jun. 5, 2003

Related U.S. Application Data

(60) Provisional application No. 60/336,645, filed on Dec. 5, 2001.

(51) Int. Cl.[7] ........................ F16L 13/14; F16L 47/00; F16L 53/00
(52) U.S. Cl. ................. 285/423; 285/382; 285/21.1; 285/381.1; 285/293.1; 285/294.1; 285/41; 285/331; 285/334.5
(58) Field of Search ..................... 285/423, 382, 285/21.1, 293.1, 294.1, 331, 381.1, 41, 334.5

(56) References Cited

U.S. PATENT DOCUMENTS

| | | | | |
|---|---|---|---|---|
| 2,332,354 A | * | 10/1943 | Stecher | 285/334.1 |
| 3,001,673 A | * | 9/1961 | Brown | 222/107 |
| 3,024,047 A | * | 3/1962 | Schmohl | 285/332.2 |
| 3,160,426 A | * | 12/1964 | Faeser | 285/95 |
| 3,246,393 A | * | 4/1966 | Worth | 29/890.144 |
| 3,583,710 A | | 6/1971 | Burelle | |
| 3,669,475 A | | 6/1972 | Luckenbill | |
| 3,695,643 A | | 10/1972 | Schmunk | |
| 3,893,716 A | | 7/1975 | Moreiras | |
| 3,909,046 A | | 9/1975 | Legris | |
| 3,929,359 A | | 12/1975 | Schmunk | |
| 3,994,515 A | | 11/1976 | Cotten | |
| 4,022,499 A | | 5/1977 | Holmes | |
| 4,037,864 A | | 7/1977 | Anderson | |
| 4,123,090 A | | 10/1978 | Kotsakis | |
| 4,298,220 A | | 11/1981 | Kukuminato | |
| 4,586,734 A | | 5/1986 | Grenier | |
| 4,635,975 A | | 1/1987 | Campbell | |
| 4,727,242 A | | 2/1988 | Barfield | |
| 4,802,696 A | | 2/1989 | Chohan et al. | |
| 4,810,009 A | | 3/1989 | Legris | |
| 4,826,218 A | | 5/1989 | Zahuranec | |
| 4,836,586 A | | 6/1989 | Martin | |
| 4,869,533 A | | 9/1989 | Lehmann | |
| 5,150,922 A | * | 9/1992 | Nakashiba et al. | 285/21.2 |

(List continued on next page.)

Primary Examiner—James M. Hewitt
(74) Attorney, Agent, or Firm—R. Thomas Payne; John A. Tomich; Patterson, Thuente, Skaar & Christensen, PA

(57) ABSTRACT

An apparatus for creating a permanent, leak-proof plastic tubing joint including a length of plastic tubing, a fitting component and a device capable of generating a local electromagnetic field. The fitting component is manufactured of a polymer containing nonpolymeric particles capable of absorbing a specific frequency of electromagnetic energy. An end of the length of plastic tubing is slidably inserted into the fitting component. When the tubing has been fully inserted, a device is activated to generate a local electromagnetic field surrounding the fitting component. The nonpolymeric particles absorb the electromagnetic energy and increase in temperature. This temperature increase causes the fitting component to begin melting at the interface with the plastic tubing while at the same time causing the end of plastic tubing to become pliable. The electromagnetic field is then removed and both the fitting component and the end of plastic tubing cool to ambient temperature. Upon cooling, the fitting component has melted in place surrounding the plastic tubing creating a permanent seal.

34 Claims, 4 Drawing Sheets

U.S. PATENT DOCUMENTS

| | | |
|---|---|---|
| 5,150,923 A | 9/1992 | Ohya |
| 5,150,926 A | 9/1992 | Egli |
| 5,292,157 A | 3/1994 | Rubichon |
| 5,332,269 A | 7/1994 | Homm |
| 5,375,889 A | 12/1994 | Nakashiba |
| 5,553,901 A | 9/1996 | Serot |
| 6,056,326 A | 5/2000 | Guest |
| 6,118,108 A | 9/2000 | Ufford |
| 6,135,508 A * | 10/2000 | Genoni et al. ............ 285/21.2 |
| 6,264,250 B1 | 7/2001 | Teraoka |

* cited by examiner

PLASTIC TUBE JOINT

RELATED APPLICATION

The present application claims the benefit of U.S. Provisional Application No. 60/336,645 filed Dec. 5, 2001, which is incorporated herein in its entirety by reference.

FIELD OF THE INVENTION

The present invention relates generally to the field of forming joints for plastic tubing. More specifically, the present invention relates to a method of forming a permanent, leak-proof joint with plastic tubing, particularly plastic tubing made of high performance polymers.

BACKGROUND OF THE INVENTION

Since its invention, plastic tubing has increasingly been used in residential, commercial and industrial applications that were previously the domain of brass, copper and steel tubing. Plastic tubing offers many advantages over its metal predecessors. Plastic tubing is extremely flexible allowing for quick and easy installation as compared to metal tubing. In the case of demanding applications, the wide variety of available plastic polymers allows a user to select chemically inert and resistant tubing to meet the unique requirements of their application. Finally, nearly anyone can install plastic tubing as it does not require the skill set that typical metal tubing installations require.

A variety of methods have been developed for creating joints with plastic tubing. Most methods involve mechanical couplings providing temporary connections. Because the typical mechanical connection functions only due to a temporary mechanical seal, the potential for leaking is present when using such connections. Examples of these types of mechanical connections include the use of ferrules with a crimp process, push-style fittings such as those manufactured by John Guest International Ltd. and threaded style compression fittings such as those manufactured by JACO Manufacturing Company.

When users confront demanding applications, users typically select the appropriate tubing based on the polymer which best provides characteristics for their application. Many users will select specialty plastic polymers such as Polyvinylidene Fluoride (PVDF), Teflon® and cross-linked Polyethylene (PEX) when the demands of the application requires concern for chemical compatibility or elevated temperature issues. Unfortunately many of the characteristics which make the use of specialty plastics desirable also lead to difficulties when a user attempts to create tubing joints. Subsequently, the user's ability to create permanent, leak-proof joints with these specialty plastics exceeds the problems associated with more standard polymers such as nylon, polyethylene and polypropylene.

An example of the types of problems associated with creating permanent, leak-proof joints is demonstrated by PEX tubing. There are several methods of manufacturing PEX. The fundamental result is that the molecular chains of polyethylene are cross-linked resulting in a polymer that shows strength and durability over a wide temperature range. Unfortunately, this strength and durability prevents PEX from exhibiting the chemical and adhesive bonding traits that are common with other polymers. Because of this limitation, a variety of mechanical means for creating joints with PEX tubing have been developed. These means typically include crimping means and metal tubing inserts.

An example of such mechanical means include the Vanguard CRIMPSERT™ metallic insert fitting. The CRIMPSERT™ fitting uses insert fittings and crimp rings made of copper or brass. Using a crimping tool, the user is able to mechanically seal the joint.

Another example of such mechanical sealing means includes the Wirsbo ProPEX® fitting system. The ProPEX® system uses the shaped-memory characteristic of PEX. An expander tool is used to expand an end of the PEX tubing. An insert fitting is inserted into this expanded tubing and the expander tool is then removed. The tubing returns to its original shape thereby compressing and holding the insert fitting in place.

While mechanical sealing means may be suitable for creating joints in plastic tubing for residential and commercial installations, these mechanical sealing means provide little value in large volume commercial and manufacturing settings. What is required is a joint forming technique for plastic tubing, especially tubing constructed of specialty plastic polymers, allowing for quick, repeatable and permanent connection of plastic tubing joints.

SUMMARY OF THE INVENTION

The joint forming technique of the present invention satisfies the requirements for sealing plastic tubing in high volume settings regardless of the tubing polymer composition. The present invention makes use of locally generated electromagnetic energy to create a permanent seal between plastic tubing and various fitting components.

The preferred embodiment includes a fitting component to be used in connecting and sealing plastic tubing with non-tubing assemblies. The invention makes use of a stationary device capable of generating an electromagnetic field. Such a device allows for high volume use of the invention while at the same time maintaining a high degree or repeatability. Examples of assemblies in which the embodiment could be practiced include water filtration equipment, appliances and plumbing connections.

An alternative embodiment includes a fitting component designed to connect and seal a plurality of plastic tubing lengths into a single, continuous tube circuit.

Another embodiment includes a portable electromagnetic field generating device which would allow the invention to be used in locations other than in a high-volume manufacturing operation. Such a device includes a handheld design allowing the invention to be practiced in areas including building construction, plumbing repair and replacement and in other remote locations where a stationary device is either unavailable or impractical.

DETAILED DESCRIPTION OF THE DRAWINGS

Figure 1:
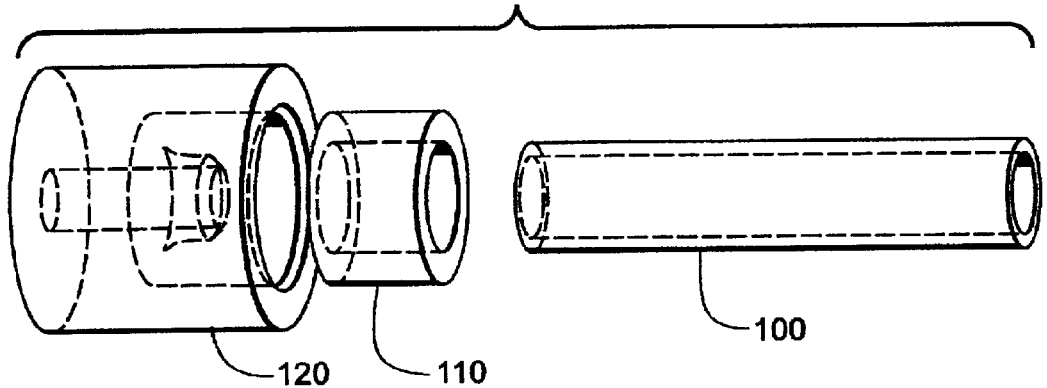
FIG. 1 is an exploded perspective view of the joint components.

As contained in FIG. 1, the joint sealing technique of the present invention is comprised of components including plastic tubing 100, sealing gasket 110 and connector 120.

Figure 2:
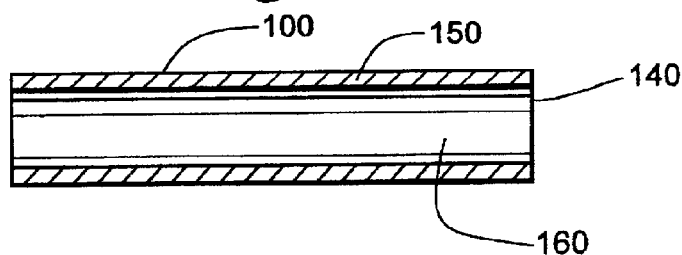
FIG. 2 is a sectional view of the plastic tubing.

FIG. 2 contains a length of plastic tubing 100. Plastic tubing 100 is defined by proximal end 130 and distal end 140. Plastic tubing 100 comprises tube wall 150 and tube cavity 160.

Figure 3:
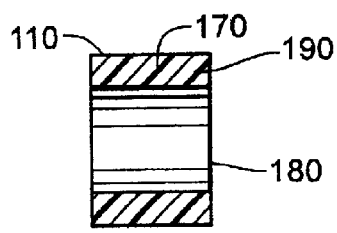
FIG. 3 is a sectional view of the sealing gasket.

FIG. 3 contains the sealing gasket 110. Sealing gasket 110 consists of gasket wall 170 and gasket cavity 180. Gasket wall 170 is comprised of a first polymer 190.

Figure 4:
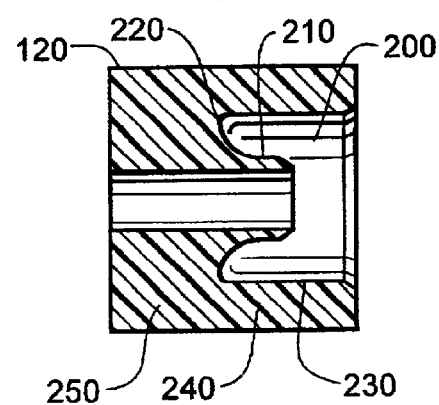
FIG. 4 is a sectional view of the connector.

FIG. 4 contains the connector 120. Connector 120 consists of receiver cavity 200, flare 210, flare base 220, gasket sealing surface 230 and connector wall 240. In alternative embodiments, connector 120 could include a plurality of receiver cavity 200. Connector wall 240 consists of a second polymer 250 containing an electromagnetic absorbing material 252. The electromagnetic absorbing material 252 within second polymer 250 could include any material capable of absorbing electromagnetic energy and subsequently generating heat when exposed to an electromagnetic energy source. Examples of such materials include carbon and a variety of metals. Ideally, first polymer 190 and second polymer 250 will comprise the same polymer. In the preferred embodiment, first polymer 190 and second polymer 250 consist of acrylonitrile-butadiene-styrene (ABS). Examples of alternative polymers include polyolefins, polycarbonates, polypropylene, polyethylene, or Norel. In alternative embodiments, first polymer 190 and second polymer 250 can comprise different polymers. Though it is recommended that first polymer 190 and second polymer 250 be compatible so as to allow chemical bonding during the sealing process, the joint sealing technique of the present invention does not require first polymer 190 and second polymer 250 be compatible.

Figure 5:
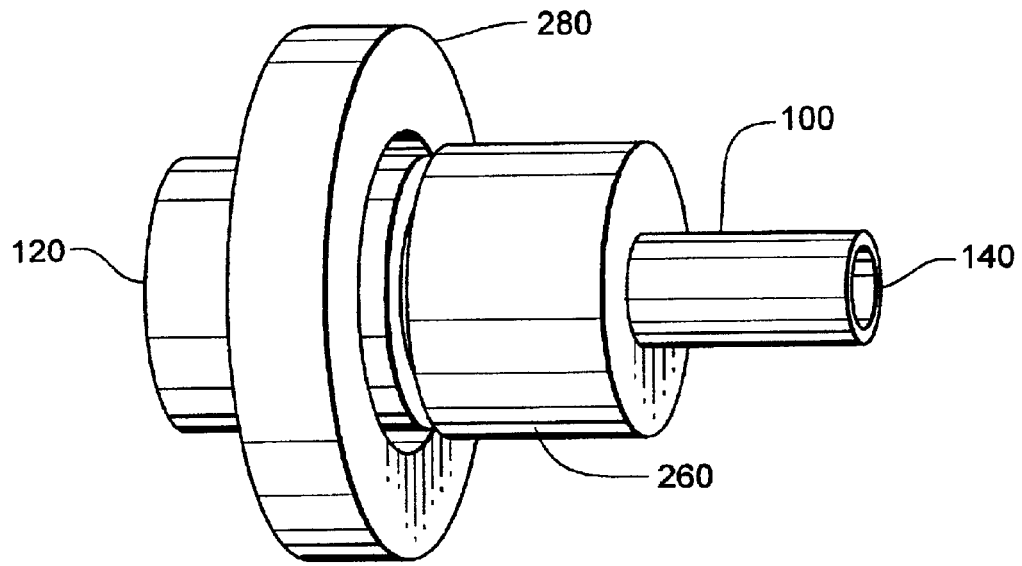
FIG. 5 is a perspective view of the joint components during the sealing process.
Figure 6:
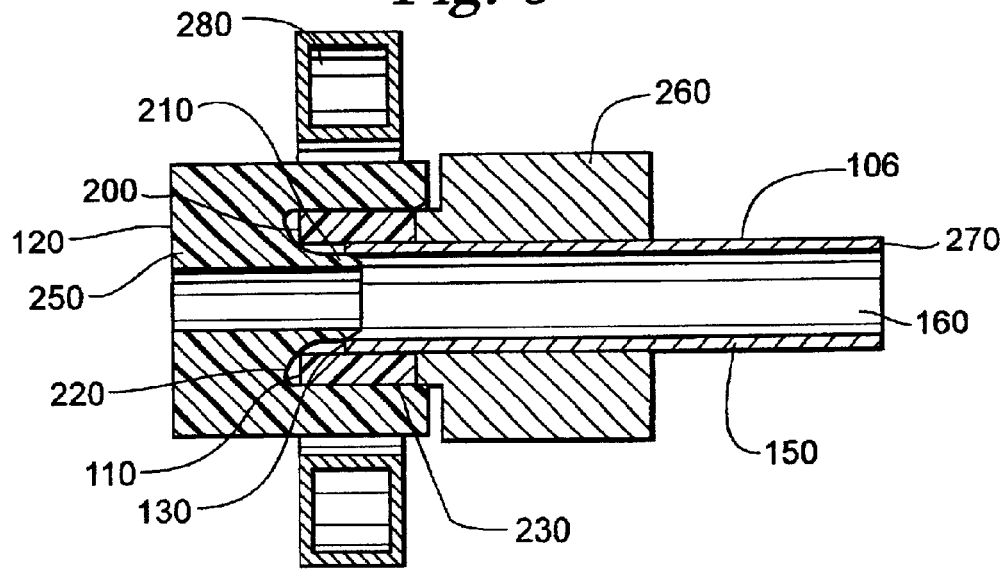
FIG. 6 is a sectional view of the joint components during the sealing process.

In practice the joint sealing technique of the present invention is shown in FIGS. 5 and 6. Sealing gasket 110 is placed over proximal end 130 of plastic tubing 100. The user slides sealing gasket 110 until the end is flush with proximal end 130 of plastic tubing 100. The user then inserts plastic tubing 100 into receiver cavity 200 of connector 120. Plastic tubing 100 should be inserted until the tip of flare 210 is inside tube cavity 160 of plastic tubing 100. At this time, sealing gasket 110 is also in contact with gasket sealing surface 230 of connector 120.

Following the placement of plastic tubing 100 into receiver cavity 200, biasing force is applied to both the plastic tubing 100 and sealing gasket 110. Sealing gasket 100 is compressed by a compression device 260 comprising a piston or similar force applicator. Plastic tubing 100 is forcibly inserted with insertion device (not shown) comprising gripping or similar insertion means. Proximal end 130 is forced into contact with flare 210 and further insertion of plastic tubing 100 is prevented. While maintaining intimate contact between proximal end 130 and flare 210, the user activates field generator 280 creating a local electromagnetic field surrounding connector 120. By activating field generator 280, the uses causes electromagnetic absorbing material 252 in second polymer 250 to absorb electromagnetic heat and being heating. As second polymer 250 increases in temperature, second polymer 250 becomes pliable. As connector 120 increases in temperature, sealing gasket 110 and plastic tubing 100 increase in temperature due to conduction. As the temperature of plastic tubing 100 is increased, proximal end 130 becomes pliable. As proximal end 130 becomes pliable, the biasing force applied by insertion device (not shown) to plastic Tubing 100 begins driving proximal end 130 over flare 210 until proximal end 130 contacts flare base 220. At the same time, compression device 260 further compresses sealing gasket 110 between gasket sealing surface 230 and tube wall 150 of plastic tubing 100. The compressed sealing gasket 110 forms an intimate seal with gasket sealing surface 230. Once proximal end 130 is in contact with flare base 220, the user deactivates field generator 280. Insertion device (not shown) is removed from contact with plastic tubing 100. Compression device 260 can either be removed or remain as part of the finished joint. Compression device 260 and insertion device (not shown) can be operated jointly or independently.

Figure 7:
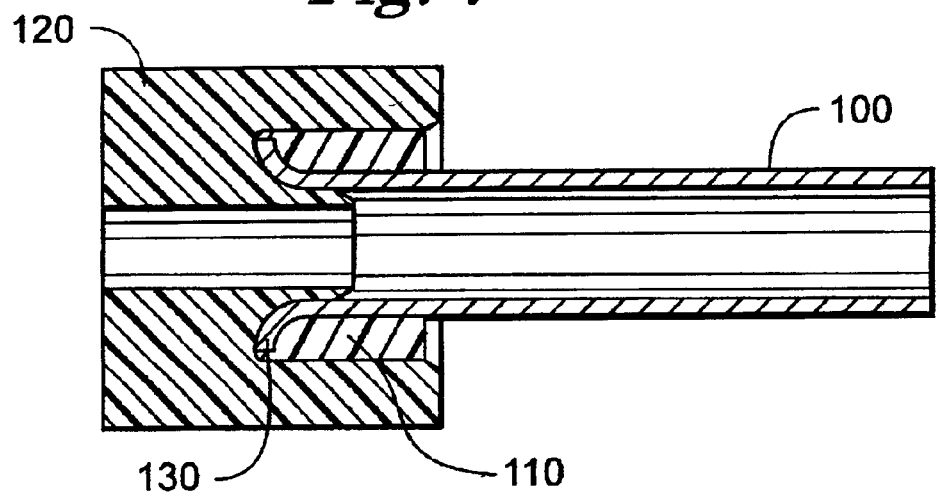
FIG. 7 is a sectional view of the sealed joint.
Figure 8:
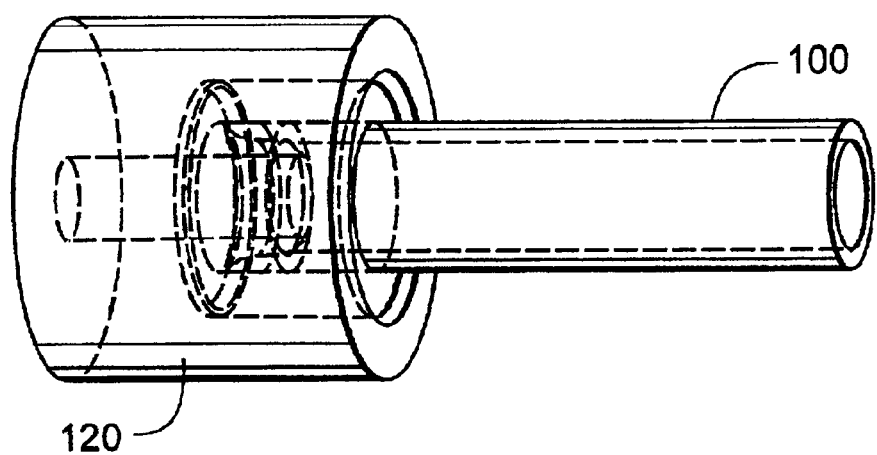
FIG. 8 is a perspective view of the sealed joint.

FIGS. 7 and 8 depict a sealed joint. After field generator 280 is withdrawn, cooling ensues and the pliability of proximal end 130 returns to its original state. Proximal end 130 remains in position over flare 210 resulting in an increase of the plastic tubing 100 diameter at proximal end 130. The increased diameter of plastic tubing 100 at proximal end 130 prevents plastic tubing 100 from being withdrawn past sealing gasket 110 resulting in a permanent, leak-proof connection. In the preferred embodiment, chemical bonding has also occurred between first polymer 190 and second polymer 250.

Figure 9:
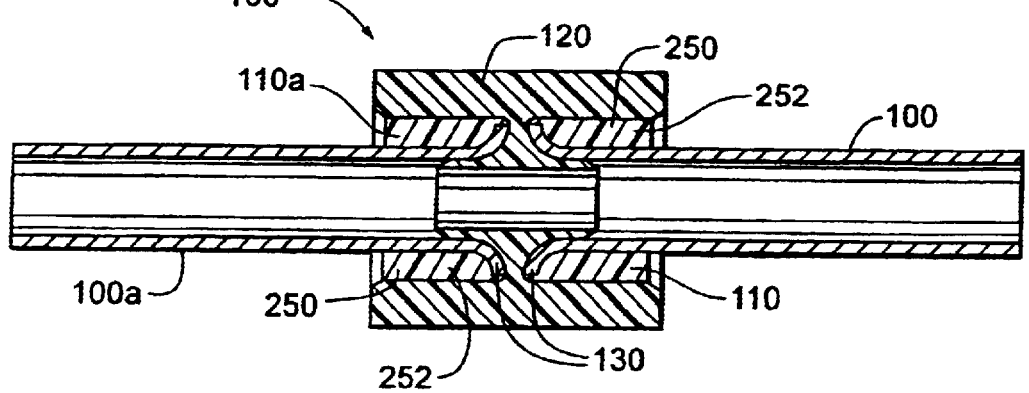
FIG. 9 is a sectional view of a joint for joining two sides.

FIG. 9 depicts a joint 100 for joining two tubes 100, 100a. A single connector 120 is used in cooperation with two sealing gaskets 110, 110a. In the embodiment, the electromagnetic absorbing material 252 is disposed in the sealing gaskets 110, 110a and heating is generated in the sealing gaskets 110, 110a and conducted to the connector 120 and the respective tubes 100, 100a.

Figure 10:
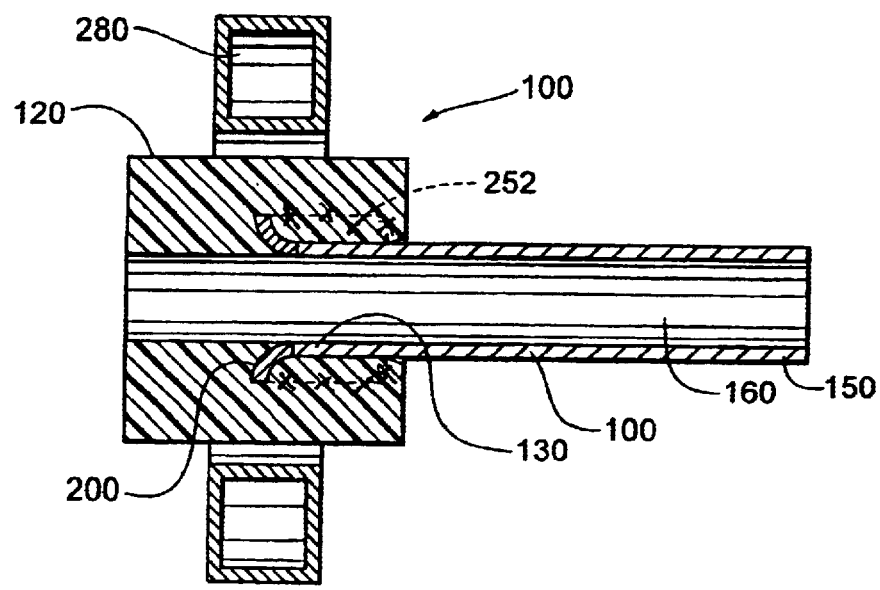
FIG. 10 is a sectional view of a connector with integral electromagnetic absorbing material.

FIG. 10 depicts a joint 100 for use without a sealing gasket 110. The electromagnetic absorbing material 252 is heated by generator 280. Heat is conducted to the proximal end 130 of tube 100, increasing the pliability of proximal end 130. A leftward directed force applied to the tube 100 forces the proximal end 130 to expand and flare into receiving cavity 200. Upon cooling, the flared proximal end 130 takes a set in its flared configuration joined to the connector 120.

What is claimed is:

1. An apparatus for creating a plastic tube joint in a length of plastic tubing having a distal end, a proximal end and a hollow lumen, the apparatus comprising:
   a fitting component comprising a connector and a gasket, the fitting component containing a plurality of nonpolymeric particles, the nonpolymeric particles selected for an ability to absorb a specific frequency of electromagnetic energy, the fitting component further comprising a through bore, said through bore having a flared protrusion, the nonpolymeric particles being heatable by a device generating a local electromagnetic field at the specific frequency, heat so generated being transferable locally to the plastic tubing for temporarily increasing the pliability of the proximal end thereof.

2. The apparatus of claim 1 wherein the connector and the gasket are each comprised of acrylonitrile-butadiene-styrene (ABS).

3. The apparatus of claim 1 wherein the connector and the gasket comprise different polymers.

4. The apparatus of claim 1 wherein the nonpolymeric particles comprise materials capable of absorbing frequencies in the radio frequency spectrum.

5. The apparatus of claim 4 wherein the nonpolymeric particles comprise metallic elements.

6. The apparatus of claim 4 wherein the nonpolymeric particles comprise carbon.

7. The apparatus of claim 1 wherein the device comprises a portable design.

8. The apparatus of claim 7 wherein the portable design comprises a handheld design.

9. A method for connecting plastic tubing, the method comprising:
providing a length of plastic tubing having a span defined between a distal end and a proximal end and having a hollow lumen defined therein;
providing a fitting component to which the plastic tubing is to be joined, the fitting component being formed of a polymer, the polymer containing a plurality of particles, the fitting component further having a through bore, said through bore having a flared protrusion;
inserting the proximal end of the length of plastic tubing into the fitting component;
applying electromagnetic energy around the perimeter of the fitting component to increase the temperature of said particles;
conducting heat through the fitting component to cause the proximal end of the length of plastic tubing to become pliable;
driving the heated, pliable flared protrusion into the hollow lumen to flare the proximal end of the length of tubing; and
cooling the proximal end of the length of tubing in situ form a flared permanent bond between the fitting component and the length of plastic tubing.

10. The method of claim 9 including forming the fitting component as a connector and a gasket.

11. The method of claim 10 including forming the connector and the gasket of the same polymer.

12. The method of claim 11 including forming the connector and the gasket of acrylonitrile-butadiene-styrene (ABS).

13. The method of claim 10 including forming the connector and the gasket of two different polymers.

14. The method of claim 9 including forming the particles of selected materials capable of absorbing frequencies in the radio frequency spectrum.

15. The method of claim 14 including the particles of metallic elements.

16. The method of claim 14 including the particles of carbon.

17. The method of claim 9 including generating the electromagnetic energy by an adjustable device capable of generating a desired electromagnetic frequency.

18. The method of claim 17 including forming the adjustable device as a portable device.

19. The method of claim 18 forming the portable device as a handheld device.

20. The method of claim 9 including forming the length of plastic tubing of a specialty plastic polymer.

21. The method of claim 20 including selecting the specialty plastic polymer from a list consisting of Polyvinylidene Fluoride (PVDF), Teflon® and cross-linked Polyethylene (PEX).

22. A joint for joining at least one plastic tube without regard to the tubing polymer composition, the tube having a pliability that is increased with the application of heat and is decreased with the removal of heat, comprising:
a connector for joining to the at least one plastic tube;
a sealing gasket being disposable in a heat conduction relationship with an end of the at least one plastic tube, the sealing gasket having entrained electromagnetic absorbing material, the electromagnetic absorbing malarial being heatable by an electromagnetic heat source, the heat being conductable to the end of the at least one plastic tube for increasing the pliability of the end of the at least one plastic tube; and
the end of the at least one plastic tube being deformable while pliable to form a scaling portion disposed in a sealing relationship with the connector and the sealing gasket, the sealing portion taking a substantially non-pliable set upon removal of heal therefrom.

23. The joint of claim 22, the tube and the connector being formed of chemically compatible polymers.

24. The joint of claim 23, the tube and the connector forming a chemical bond during joining of the tube and the connector.

25. The joint of claim 22, the tube and the connector being formed of chemically incompatible polymers.

26. The joint of claim 22, the tube joined at the joint being formed of a material selected from a list consisting of acrylonitrile-butadiene-styrene (ABS), polyolefins, polycarbonates, polypropylene, polyethylene, Norel, Polyvinylidene Fluoride (PVDF), Teflon®, and cross-linked Polyethylene (PEX).

27. The joint of claim 22, the connector being formed of a material selected from a list consisting of acrylonitrile-butadiene-styrene (ABS), polyolefins, polycarbonates, polypropylene, polyethylene, and Norel.

28. The joint of claim 22, the sealing portion being flared while in a pliable state, the flare being captured between the connector and the sealing gasket.

29. The joint of claim 22, further including a compression device having a bore defined therein for receiving the tube, a bias exerted on the compression device while the end of the tube is in a pliable state acting to form a seal between the sealing gasket and the sealing portion.

30. The joint of claim 29, the compression device being removed from the tube after setting of the sealing portion.

31. The joint of claim 29, the compression device being retained integral with the tube after setting of the sealing portion.

32. A joint for joining at least one plastic tube without regard to the tubing polymer composition, the tube having a pliability that is increased with the application of heat and is decreased with the removal of heat, comprising:
a connector for joining to the at least one plastic tube, the connector having entrained electromagnetic absorbing material, the electromagnetic absorbing material being heatable by an electromagnetic heat source, the heat being conductable to an end of the at least one plastic tube for increasing the pliability of the end of the at least one plastic tube; and
the end of the at least one plastic tube being deformable while pliable to form a sealing portion disposed in a sealing relationship with the connector, the sealing portion taking a substantially non-pliable set upon removal of heat therefrom, a sealing gasket being disposable in a heat conduction relationship with the end of the at least one plastic tube and with the connector.

33. A joint for joining at least one plastic tube without regard to the tubing, polymer composition, the tube having a pliability that is increased with the application of beat and is decreased with the removal of heat, comprising:
a connector for joining to the at least one plastic tube, the connector having entrained electromagnetic absorbing material, the electromagnetic absorbing material being heatable by an electromagnetic heat source, the heat being conductable to an end of the at least one plastic tube for increasing the pliability of the end of the at least one plastic tube; and the end of the at least one plastic tube being deformable while pliable to form a sealing portion disposed in a sealing relationship with the connector, the sealing portion taking a substantially non-pliable set upon removal of heat therefrom, the tube joined at the joint being formed of a material selected from a list consisting of acrylonitrile-butadiene-styrene (ABS), polyolefins, polycarbonates, polypropylene, polyethylene, Norel, Polyvinylidene Fluoride (PVDF), Teflon®, and cross-linked Polyethylene (PEX).

34. The joint of claim 32, the connector being formed of a material selected from a list consisting of acrylonitrile-butadiene-styrene (ABS), polyolefins, polycarbonates, polypropylene, polyethylene, and Norel.

* * * * *

UNITED STATES PATENT AND TRADEMARK OFFICE
CERTIFICATE OF CORRECTION

PATENT NO. : 6,857,670 B2  Page 1 of 1
APPLICATION NO. : 10/124847
DATED : February 22, 2005
INVENTOR(S) : Karl Fritze It is certified that error appears in the above-identified patent and that said Letters Patent is hereby corrected as shown below:

Column 4
Line 1, delete "Tubing" and insert in place thereof -- tubing --.
Line 22, delete "leak-proof" and insert in place thereof -- leakproof --.

Column 5
Lines 27-28, delete "situ form" and insert in place thereof -- situ to form --.
Line 42, delete "including the" insert in place thereof -- including forming the --.
Line 44, delete "including the" insert in place thereof -- including forming the --.
Line 51, delete "claim 18 forming" insert in place thereof -- claim 18 including forming --.

Column 6
Line 1, delete "malarial" and insert in place thereof -- material --.
Line 6, delete "scaling" and insert in place thereof -- sealing --.
Line 9, delete "heal" and insert in place thereof -- heat --.
Line 58, delete "tubing," and insert in place thereof -- tubing --.
Line 59, delete "beat" and insert in place thereof -- heat --.

Column 7
Line 3, delete "scaling" and insert in place thereof -- sealing --.

Signed and Sealed this

Eleventh Day of November, 2008

JON W. DUDAS
*Director of the United States Patent and Trademark Office*